Aug. 20, 1935.  H. J. MILLER  2,011,771

LIGHT FLASH PRODUCING DEVICE

Filed July 15, 1931

Inventor
Henry J. Miller,
By Bean, Brooks & Henry.
Attorneys

Patented Aug. 20, 1935

2,011,771

UNITED STATES PATENT OFFICE 2,011,771

LIGHT FLASH PRODUCING DEVICE

Henry J. Miller, Emporium, Pa.

Application July 15, 1931, Serial No. 551,034

2 Claims. (Cl. 67—31)

The present invention relates to a method of and means for influencing the spectroscopic characteristics of the light flash produced by the reaction of thin metallic foil with an oxygenizing material, and for regulating the speed of such flash.

Heretofore, in the production of photographs under insufficient natural illumination, it has been found advantageous to supply artificial illumination for photographic purposes by creating rapid combustion of metallic ribbon or foil with concomitant evolution of light. The light emitted by the combustion of these metallic foils is characterized in that it is very rich in light rays in certain portions of the visible spectrum but deficient in light intensity in other portions. Light of this unbalanced spectroscopic characteristic or intensity produces photographs of an object in which the weight or effect of certain colors thereof are not apparent and in which their full and natural value and tone are lacking even though panchromatic plates or films be used which under natural illumination of white light reproduce the color of the object photographed.

In photographing moving objects by artificial illumination it has been found desirable to use light flashes of short duration, especially in those cases where the movement of the object cannot be easily or readily controlled. However, even with flash producing devices heretofore used, the light flashes have been found to be unduly long and photographs taken by means thereof show movement, especially where the object be a child or animal. It is proposed to produce a light flash, the duration of which is regulated by the temperature of ignition and combustion of a suitable metallic foil, whereby flashes of extremely short duration are produced.

The instant invention provides a photographic flash lamp provided with metallic foil which has been so treated that, upon reaction of the foil with an oxygenating material, a light flash is produced, the spectrum of which comprises a desirable distribution of light intensity over the various portions of the visible spectrum and which may be efficaciously used to bring out the color values of the object to be photographed if panchromatic plates or films be used.

Figure 1:
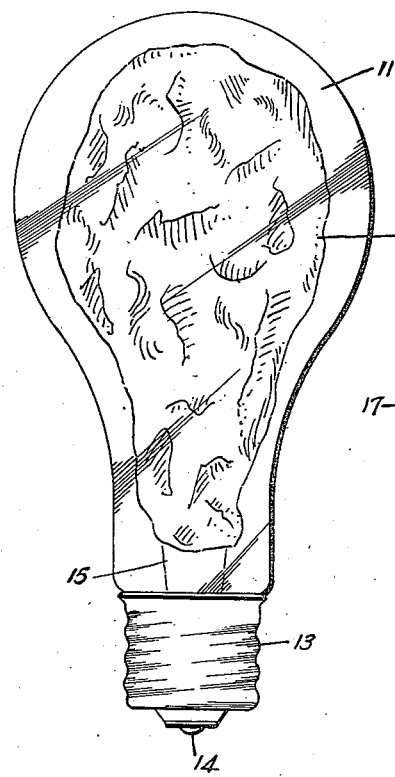
Fig. 1 is a side elevation of the finished device.

Referring more particularly to the drawing, a photographic flash lamp or bulb 10 is shown in Fig. 1 which comprises a transparent containing member or envelope 11, having contained therein a metallic foil 12 for the production of substantially instantaneous light flashes upon the combustion thereof with oxygenating material contained within the transparent bulb and in contact with the metal foil. The bulb or envelope 11 is provided with a base 13 which is attached thereto in any desired or convenient manner whereby the same are retained in assembled relation. The base 13 is provided with an electric contact member 14 through which electrical energy may be transmitted to combustion starting means contained within the bulb, and in contact with the foil therein, when the bulb and base members are in contact with a suitable source of electric current, as for instance a hand battery or the usual house lighting current.

A stem member 15, of suitable composition, is attached to the lower portions of the bulb in such fashion as to maintain a substantially fixed and rigid position with respect to the wall members or envelope thereof, and to prevent inadvertent displacement of an igniting or combustion charge 16 which is carried upon filament wires 17 and 18 embedded in and extending through the stem member 15 and having electrical contact with the contact members 13 and 14.

Figure 3:
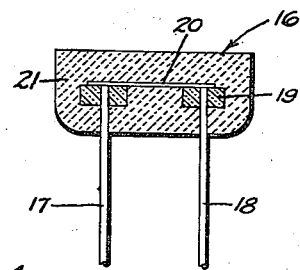
Fig. 3 is an enlarged view of the ignition starter.
Figure 4:
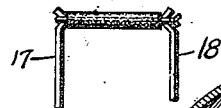
Fig. 4 is an enlarged view of another form of ignition starter.
Figure 2:
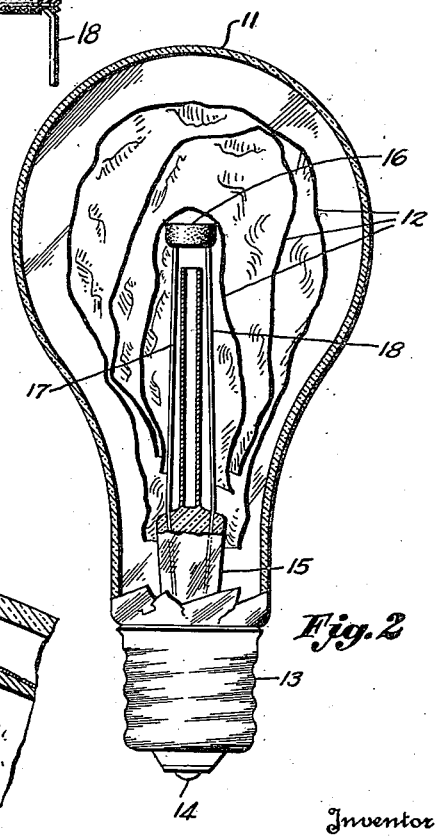
Fig. 2 is a vertical section of the device.
Figure 5:
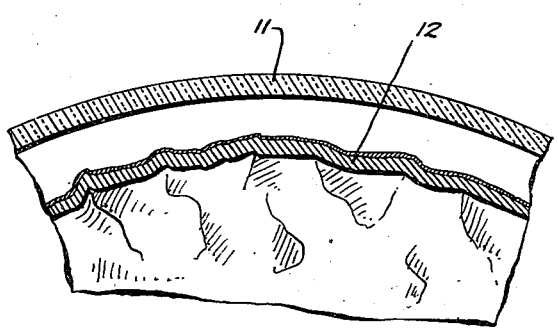
Fig. 5 is an enlarged fragmentary drawing of the enclosing bulb and contained foil, showing in exaggerated degree the light regulating film thereon.

The ignition starter comprises an electrically conducting member in electrical contact with the lead in wire and means for carrying a combustible charge which may in certain cases be independent of the conducting member, or may be integral therewith. Thus in Fig. 3 the combustion or igniting member 16 comprises a plate or circular member 19 attached to the upper ends of the filament wires 17 and 18 and having a fuse wire 20 in electrical contact with the filament wires. In Fig. 4 a hairpin wire connects the filament wires 17 and 18 and carries igniting mixture therearound and therebetween. The igniting mixture 21 comprises a mixture of finely divided metallic elements capable of being oxidized, and materials rich in oxygen capable of supplying their oxygen to the oxygen receiving metal. Typical metals which may be used in this mixture are silicon, aluminum, magnesium and other metals from iron to calcium inclusive, in the electro-chemical series. The oxygen liberating material may efficaciously be a peroxide, such as those of the alkaline earth metals, or certain nitrates or chlorate as for instance those of the alkali metals. This mixture of materials is mixed with a binding agent comprising a cellulose ester solution in a suitable solvent. This mixture coated upon the filament wire and ring comprises the finished combustion or ignition starter.

Since the ignition or combustion starter comprises readily combustible metals and metals which upon oxidation emit relatively large quantities of heat for each mole of metal oxidized, passage of current through the filament 20 having started the oxidation, the immediately surrounding and contiguous foil, is heated to a relatively high temperature and ignites and burns with great rapidity. I believe that at this high temperature, the speed with which the metallic foil and oxygenating material contained within the bulb ignites, is relatively much greater than the speed of union at lower temperatures, such as temperatures which are produced by radiation from a coated wire heated to substantial incandescence. This regulation of the heat produced by the ignition or starter thus acts as a direct control upon the speed of the flash and therefore upon the production of photographs of moving objects in which a flash of very short duration is found most desirable.

In the type of flash used heretofore an aluminum foil was enclosed within a transparent bulb and ignited by the heat radiation of a coated filament or fuse wire. As mentioned herein, this type of photographic flash bulb produced a light flash of undue duration, and at the same time the nature of the light produced did not reproduce full color values in all parts of the spectrum when panchromatic plates or films were used to photograph colored objects, since the spectrographic characteristic and intensity of the light was concentrated substantially in one portion of the spectrum.

The foil which I propose to use in my photographic flash lamp for controling the spectrographic characteristics of the emitted light comprises a metallic foil which has been especially treated and compounded with materials which when heated emit a light spectrum of the desired distribution of intensity in those portions of the spectrum wherein the foil alone is insufficient in those light emitting rays. I further propose to use substances in conjunction with a metallic foil which do not combine or react chemically therewith nor with the oxygenating materials contained within the bulb at room temperature nor which explode or detonate upon ignition, with consequent rupture and shattering of the bulb.

I further propose to associate the light emitting substances with the metallic foil in such fashion that, by means of their participation in the flash reaction, they do not influence adversely the speed of the resulting flash.

I propose to coat the thin metallic foil used in the photographic flash bulb with elements or compounds which emit distinctive spectrographic lines. As typical examples I have found that elements in ether the alkaline earth group of the periodic table or the alkali metal group of the periodic table may be used for the purpose, but I may use other materials which emit light rays in a suitable part of the spectrum. The compounds which I have found desirable for use are halogen derivatives of the metals contained in the groups mentioned herein above although certain other derivatives may be used, as for instance the oxides, or even certain other salts, as for instance, the manganates and permanganates. I prepare these color influencing compounds in a finely divided state and, wherever possible prepare them in the colloidal condition so that as a small quantity of the material may be used as will present as large a surface as possible as a coating for the foil. This very finely divided or colloidal material is suspended in a solution of a cellulose ester contained in a highly volatile solvent, such as the organic solvents, and one which will evaporate substantially completely after application of the solution, and the solution is applied in any convenient fashion to the foil to form the coating 23.

Certain other materials spread in finely divided form on the foil may be used to regulate the spectroscopic characteristics of the emitted light and at the same time influence the speed of the flash. Thus a thin coating of metallic salts of certain organic acids, as for instance the resinates of the metals of the groups mentioned above possess this property. Further regulation may be obtained by thinly coating one side of the foil with the ignition mixture of metallic powder and oxidizing material mentioned herein. The temperature of combustion is thereby sustained, and the flash is extremely rapid.

In certain cases I have been able to apply this solution to the foil by means of a spray method and produce upon the foil a very thin film of cellulose ester carrying a small quantity of the color emitting material uniformly distributed throughout the foil. I have found it desirable to use so little of the cellulose ester as is consistent with efficient film production, as relatively larger quantities thereof interfere with the combustion of the foil and decrease the speed of the resulting flash, and therefore for certain types of photographic purposes decrease the utility of the flash lamp.

As a comparative example of the quality of the light emitted from an aluminum foil and a foil made according to one specific form of my invention, I may state that the visible spectrum of an aluminum foil photographic flash bulb shows a fair intensity in the red end of the spectrum in the neighborhood of sixty five hundred Ångstrom units and extends to about sixty three fifty Ångstrom units. The yellow portion of the spectrum possesses fair intensity and shows a definite line at about 5,640 and the green portion of the spectrum shows fair intensity down to 4,900 Ångstroms. The blue portion of the spectrum in the neighborhood 4,500 Ångstroms shows a fair intensity which extends from about 3,920 to 4,800. The intensity of the light in the violet, for instance that extending down to about 3,050 shows a gradually diminishing intensity.

On the other hand, the characteristics of the light produced from a photographic flash bulb made according to my invention from a metallic aluminum foil coated with a material such as barium fluoride the weight of which may vary from about 1% to 50% of that of the foil used in the lamp, possesses a much higher intensity in the yellow range and a very active violet band. Thus, at the red end of the spectrum the intensity of the flash produced according to my invention has about the same intensity as that produced from an uncoated foil, while in the yellow region the line at 5640 Ångstrom shows a decidedly greater intensity, and in the violet from about 3920 to 3470 the spectrum is decidedly more intense from the coated than from the uncoated foils. It will thus be seen that a material advantage is possessed by the coated foils over the uncoated foils for light production in the very active violet region which induce photo chemical reactions upon the various actinic sensitive materials contained within the photographic plate or film. From the examples of coating materials given above, it will be seen that it is possible to obtain any desired spectrum or increase the intensity of any band at will.

This advantage is decidedly noticeable in the production of photographs wherein a truer relation between the tone values of the various colors possessed by the object is desired.

I have found that ordinarily the speed of the flash is not materially decreased until the weight of the coating of the light emitting material is considerably greater than 20% of the weight of the foil used in the lamp.

It is further seen that the speed of the flash lamp may be efficiently controlled by selecting the desirable coating material and regulating the thickness of the coating thereof upon the foil; increased thickness of coating causing losses between the reacting metallic foil and oxygen with a resultant decrease in the speed of the reaction therebetween. Further, a starting and igniting mixture has been suggested which generates a materially larger quantity of heat than that generated by the radiation method theretofore used, and in addition the foil contained within the bulb is caused to be in contact with the ignition and starting charge whereby a direct and positive ignition of the foil is insured with a resultant increase in the speed of the flash, whereby photographs of living objects in motion may be readily obtained particularly when such objects are not subject to ready control in their movement as for instance animals and children.

The gaseous envelope in contact with foil and confined within the bulb is desirably an oxidizing atmosphere as for instance, air or oxygen. Should oxygen alone be used, the presence thereof may desirably be less than atmospheric pressure although air at atmospheric pressure may be used with some sacrifice in the speed of the light flash.

What is claimed is:

1. In a photographic flash lamp having an enclosing transparent bulb, a portion attached to the bulb for engagement with an electric outlet socket, contact means on said portion for making electric contact with a source of electric current, means for conducting current from said contact means to the interior of said bulb, thermite means in contact with said last mentioned means adapted to ignite with evolution of heat upon passage of current through said electrically conducting means and aluminum foil in said bulb having a coating thereon of a finely divided mixture of a metal between iron and calcium inclusive in the electro-chemical series and an oxidizing material, said finely divided material being retained upon said foil by a cellulose derivative film.

2. In a photographic flash lamp having an enclosing transparent bulb, a portion attached to the bulb for engagement with an electric outlet socket, contact means on said portion for making electric contact with a source of electric current, means for conducting current from said contact means to the interior of said bulb, thermite means in contact with said last mentioned means adapted to ignite with evolution of heat upon passage of current through said electrically conducting means, and aluminum foil in said bulb having a coating upon one side thereof of a finely divided salt of a metal emitting light at high temperature having spectral characteristics different from those emitted by the foil upon combustion and a coating upon the other side thereof of a finely divided mixture of a metal between iron and calcium inclusive in the electro-chemical series and an oxidizing material, said coatings being retained upon the foil by a cellulose derivative film.

HENRY J. MILLER.